United States Patent
Ribas et al.

(10) Patent No.: US 10,821,557 B2
(45) Date of Patent: Nov. 3, 2020

(54) HIGH RELIABILITY LEAD-FREE SOLDER ALLOY

(71) Applicant: Alpha Assembly Solutions Inc., Somerset, NJ (US)

(72) Inventors: Morgana De Avila Ribas, Bangalore (IN); Suresh Telu, Bangalore (IN); Pritha Choudhury, Bangalore (IN); Anil K. N. Kumar, Bangalore (IN); Siuli Sarkar, Bangalore (IN)

(73) Assignee: Alpha Assembly Solutions Inc., Somerset, NJ (US)

( * ) Notice: Subject to any disclaimer, the term of this patent is extended or adjusted under 35 U.S.C. 154(b) by 92 days.

(21) Appl. No.: 16/098,367

(22) PCT Filed: May 2, 2017

(86) PCT No.: PCT/US2017/030547
§ 371 (c)(1),
(2) Date: Nov. 1, 2018

(87) PCT Pub. No.: WO2017/192517
PCT Pub. Date: Nov. 9, 2017

(65) Prior Publication Data
US 2019/0389012 A1    Dec. 26, 2019

(30) Foreign Application Priority Data
May 6, 2016    (IN) .............................. 201611015846

(51) Int. Cl.
| B23K 1/00 | (2006.01) |
| B23K 35/26 | (2006.01) |
| C22C 13/02 | (2006.01) |

(52) U.S. Cl.
CPC .............. B23K 35/262 (2013.01); B23K 1/00 (2013.01); C22C 13/02 (2013.01)

(58) Field of Classification Search
CPC .... B23K 35/262; B23K 1/00; B23K 35/0244; B23K 35/025; C22C 13/02
USPC ................................................ 420/557–562
See application file for complete search history.

(56) References Cited

U.S. PATENT DOCUMENTS

| 2,781,577 | A | * | 2/1957 | Smellie ................ B23K 35/282 |
| | | | | 228/207 |
| 7,282,175 | B2 | | 10/2007 | Amagai et al. |
| 9,221,129 | B2 | | 12/2015 | Imamura et al. |
| 2002/0155024 | A1 | * | 10/2002 | Hwang .................... C22C 13/02 |
| | | | | 420/561 |
| 2004/0108597 | A1 | * | 6/2004 | Ishida ........................ C22C 1/02 |
| | | | | 257/741 |
| 2007/0036671 | A1 | * | 2/2007 | Albrecht ............... B23K 35/262 |
| | | | | 420/561 |
| 2007/0295528 | A1 | | 12/2007 | Nishi et al. |
| 2017/0266765 | A1 | * | 9/2017 | Zhang ..................... C22C 12/00 |

FOREIGN PATENT DOCUMENTS

| EP | 2868424 | 5/2015 |
| EP | 3235587 | 10/2017 |
| GB | 747813 A | * 4/1956 ......... B23K 35/3603 |
| JP | 4938858 | 4/1974 |
| JP | 2004-261863 | 9/2004 |
| JP | 2014-28391 | 2/2014 |
| JP | 2014-28391 B1 | 2/2014 |
| JP | 2014-524354 | 9/2014 |
| JP | 5723056 | 5/2015 |
| WO | 2013/017883 | 2/2013 |

OTHER PUBLICATIONS

English translation of Office action dated Nov. 27, 2019 issued in corresponding Japanese application No. 2018-556486.

* cited by examiner

*Primary Examiner* — Kiley S Stoner
(74) *Attorney, Agent, or Firm* — Carmody Torrance Sandak & Hennessey LLP

(57) ABSTRACT

Lead-free solder alloys are described that exhibit favorable high temperature mechanical reliability and thermal fatigue resistance, and are typically capable of withstanding operational temperatures of at least 150° C., for example up to 175° C. The alloys may exhibit improved high temperature mechanical properties compared to the conventional Sn—Ag—Cu and Pb5Sn2.5Ag. The solder may be in the form of a bar, a stick, a solid or flux cored wire, a foil or strip, a film, a preform, or a powder or paste (i.e., a powder plus flux blend), or solder spheres for use in ball grid array joints or chip scale packages, or other pre-formed solder pieces, or a reflowed or solidified solder joint, or pre-applied on any solderable material such as a copper ribbon.

23 Claims, 10 Drawing Sheets

HIGH RELIABILITY LEAD-FREE SOLDER ALLOY

FIELD OF THE INVENTION

The present invention relates generally to the field of metallurgy and to an alloy and, in particular, a lead-free solder alloy. The alloy is particularly, though not exclusively, suitable for use in electronic soldering applications such as wave soldering, surface mounting technology, hot air leveling and ball grid arrays, land grid arrays, bottom terminated packages, LEDs and chip scale packages.

BACKGROUND OF THE INVENTION

High operating temperature lead-free solder alloys are necessary for current as well as future requirements of medium/high-power semiconductors. One of the biggest challenges for medium/high-power semiconductor devices is to be reliable in harsh environments; sometimes operating temperatures can go up to 175° C. In addition, high powder loads, which can reach hundreds of watts per device, can cause thermal gradient. In other words, the surrounding temperature of the device increases rapidly, when the said device is switched on, and decreases rapidly when the device is switched off. These rapid temperature changes upon repeated power on and off cycling can cause serious reliability concerns. For example, enormous stress will be generated in the semiconductor components, driven specially by CTE differences between semiconductor and insulating materials.

From a metallurgical point of view, solder materials with high melting temperature, which require no more than 280-300° C. peak reflow temperature, good electrical and thermal conductivity, and good high temperature mechanical and thermal properties are essential alloy requirements for these applications. More importantly, these alloys should have high fatigue life to accommodate high service life and design requirements. Other general requirements for solder alloys are: (i) easy availability of raw materials; (ii) adaptable to existing manufacturing processes; (iii) compatible with other materials used in the assembly process.

Existing lead-based high melting and high operating temperature alloy, such as 92.5Pb5Sn2.5Ag, cannot be used in applications that are governed by legislation such as RoHS, whereas conventional Sn—Ag—Cu alloys do not pass high reliability performance requirements. Another existing solution for high operational temperature applications is the 80Au20Sn alloy. However, its high cost is a major concern.

Previous attempts of solving the problem associate with the prior art were not successful. For example, U.S. Pat. Pub. No. 2015/0246417 to Zhang, which describes a mixed alloy solder paste and U.S. Pat. Pub. No. 2010/0096043 to McCluskey, which describes transient liquid phase soldering, the subject matter of each of which is herein incorporated by reference in its entirety, have both been suggested for high temperature soldering applications. However, these approaches have severe technical limitations that prevent them from being scaled up for industrial manufacturing, and/or prevent them from being used in solder formats other than solder paste. Other Sn—Sb alloys reported in the literature have poor fatigue and thermo-mechanical properties. For example, JP 2009-070863A discloses a Sn-15Sb alloy, having a solidus temperature of 246° C. and a liquidus temperature of 290° C. Besides the high tensile strength of such alloy, which is expected due to solid solution of Sb in Sn, such alloy lacks strength when subjected to cyclic stresses.

Compositions of Sn—Ag—Cu with Sb:Bi (1:1.5 to 3) and other alloying additions were disclosed in WO2004/096484. Unlike the compositions disclosed in the present invention, the alloy compositions disclosed in there have liquidus temperature around 220° C., and claim maximum operating temperature of 150° C.

The 58 wt % of Bi forms a eutectic reaction with Sn at a temperature of 138° C. On the other hand, Sb has limited solubility in Sn, where the Sn rich zone exhibits a peritectic reaction. The Bi—Sb is an isomorphous system with a miscibility gap at temperatures <180° C. Therefore, the strength of an alloy can be significantly enhanced by adding Sb and/or Bi to Sn. Addition of Sb can impart relatively larger elongation compared to the Bi addition. However, it is well known that fatigue life is not necessarily dependent on plastic deformation, as plastic deformation is much localized and not discernable by a macroscopic evaluation of the component. Fatigue life is rather more dependent on the alloy behavior at the microstructural level, which changes in response to the applied stresses.

For better microstructural stability, near peritectic Sn—Sb composition (~10.2 wt. % Sb) is ideal. Moreover, near peritectic composition favors the formation an alloy with a liquidus temperature of 270° C. or less. Optimized additions of Sb and Bi are very much useful for attaining desired levels of fatigue life and strength.

Developing an alloy fulfilling all these specific and general requirements is a challenging task. The present invention aims to solve at least some of the problems associated with the prior art or to provide a commercially acceptable alternative.

SUMMARY OF THE INVENTION

Accordingly, in a first aspect, the present invention provides a lead-free solder alloy comprising:
from 8 to 15 wt. % antimony,
from 0.05 to 5 wt. % bismuth,
from 0.1 to 10 wt. % silver,
from 0.1 to 4 wt. % copper,
one or more of
up to 1 wt. % nickel,
up to 1 wt. % cobalt,
up to 1 wt. % titanium,
up to 1 wt. % manganese,
up to 1 wt. % germanium,
up to 10 wt. % aluminum,
up to 10 wt. % silicon,
optionally one or more of
up to 5 wt. % indium,
up to 1 wt. % chromium,
up to 1 wt. % zinc,
up to 1 wt. % arsenic,
up to 1 wt. % iron,
up to 1 wt. % phosphorus,
up to 1 wt. % gold,
up to 1 wt. % gallium,
up to 1 wt. % tellurium,
up to 1 wt. % selenium,
up to 1 wt. % calcium,
up to 1 wt. % vanadium,
up to 1 wt. % molybdenum,
up to 1 wt. % platinum,
up to 1 wt % rare earth elements,
the balance tin and any unavoidable impurities.

The alloy may exhibit a combination of a high melting point, good high temperature mechanical reliability and good thermal fatigue resistance, and may be advantageously used in high operation temperature applications such as, for example, medium and high power semiconductor devices.

BRIEF DESCRIPTION OF THE DRAWINGS

For a fuller understanding of the invention, reference is made to the following description taken in connection with the accompanying figures, in which.

DETAILED DESCRIPTION OF THE PREFERRED EMBODIMENTS

Figure 1:
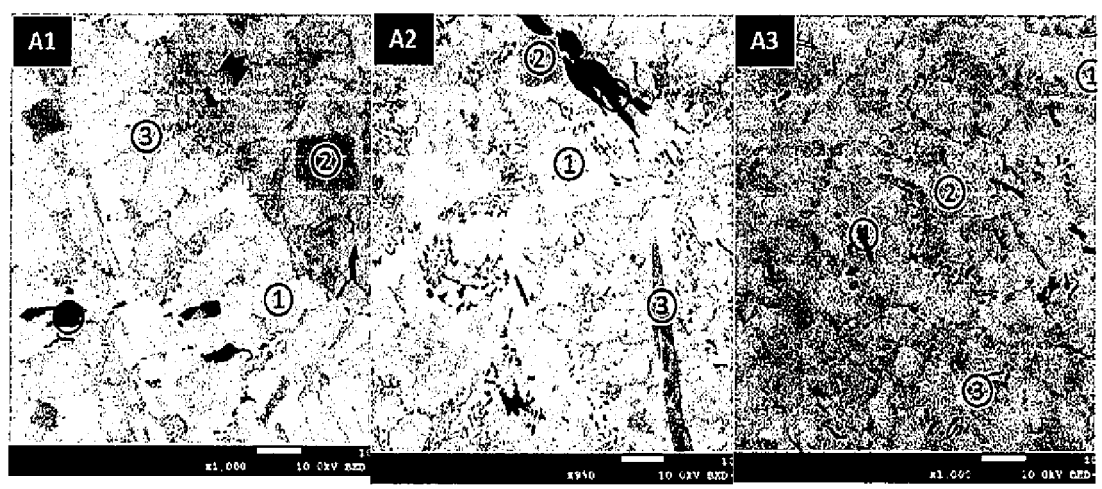
FIG. 1 shows electron microscope images of the microstructure of examples A1, A2 and A3 according to the present invention.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The term "solder alloy" used herein encompasses a fusible metal alloy with a melting point in the range of from 80 to 400° C.

The term "rare earth element" used herein encompasses an element selected from the group consisting of Sc, Y, La, Ce, Pr, Nd, Pm, Sm, Eu, Gd, Tb, Dy, Ho, Er, Tm, Yb and Lu.

The term "flux" as used herein encompasses a substance, often an acid or base, used to promote fusing of metals and in particular to remove and prevent the formation of metal oxides.

The term "solidus" as used herein encompasses the temperature below which a given substance is completely solid (crystallized). The solidus quantifies the temperature at which melting of a substance begins, but is not necessarily melted completely, i.e. the solidus is not necessarily a melting point.

The term "liquidus" as used herein encompasses the maximum temperature at which crystals can co-exist with molten substance. Above the liquidus temperature the material is homogeneous and liquid at equilibrium. Below the liquidus temperature more and more crystals may form. The solidus and liquidus temperatures do not align or overlap in all cases. If a gap exists between the solidus and liquidus temperatures it is called the "freezing range" or "mush range", and within that gap the substance consists of a mixture of solid and liquid phases.

The lead-free solder alloys described herein may exhibit a relatively high melting point, for example a solidus temperature of at least 220° C. The temperature range between the solidus and the liquidus is typically not more than 60° C.

The lead-free solder alloys described herein may exhibit favorable high temperature mechanical reliability and thermal fatigue resistance, and are typically capable of withstanding operational temperatures of at least 150° C., for example up to 175° C. The alloys may exhibit improved high temperature mechanical properties compared to the conventional Sn—Ag—Cu and Pb5Sn2.5Ag alloys. The alloys may also exhibit high electrical and thermal conductivity.

The alloys may be advantageously used in high operation temperature applications such as, for example, high power semiconductor applications such as, for example, High Brightness LEDs (HBLEDs), motor controls, solar concentrator cells, RF circuits and microwave circuits.

The alloys are lead-free meaning that no lead is added intentionally. Thus, the lead contents are zero or at no more than accidental impurity levels.

The alloy comprises from 8 to 15 wt. % antimony. Preferably, the alloy comprises from 8.5 to 13 wt. % antimony, more preferably from 9 to 11 wt. % antimony, even more preferably from 9.5 to 10.5 wt. % antimony, still even more preferably about 10 wt. % antimony. The presence of antimony in the recited amounts may serve to improve the strength of the alloy at high temperatures through the formation of a solid solution with tin.

The alloy comprises from 0.05 to 5 wt. % bismuth. Preferably, the alloy comprises from 0.08 to 3 wt. % bismuth, more preferably from 0.1 to 2 wt. % bismuth, even more preferably from 0.5 to 1.5 wt. % bismuth. In a preferred embodiment, the alloy comprises from 0.8 to 1.2 wt. % bismuth. In an alternative preferred embodiment, the alloy comprises from 0.3 to 0.7 wt. % bismuth. In an alternative preferred embodiment, the alloy comprises from 0.2 to 0.3 wt. % bismuth. In an alternative preferred embodiment, the alloy comprises from 0.05 to 0.2 wt. % bismuth. The presence of bismuth in the recited amounts may serve to improve the strength of the alloy at high temperatures through the formation of a solid solution with tin. Bismuth may act to improve high temperature mechanical properties. Bismuth may also improve wetting and spread.

The alloy comprises from 0.1 to 10 wt. % silver. Preferably, the alloy comprises from 1 to 5 wt. % silver, more preferably from 2 to 4 wt. % silver, even more preferably from 2.5 to 4.2 wt. % silver. In a preferred embodiment, the alloy comprises from 2.8 to 3.2 wt % silver. In an alternative preferred embodiment, the alloy comprises from 3.8 to 4.2 wt. % silver. The presence of silver in the recited amounts may contribute to higher thermal fatigue life. In addition, silver may form silver-tin intermetallics that contribute to better mechanical properties. Silver may also improve wetting and spread.

The alloy comprises from 0.1 to 4 wt. % copper. Preferably, the alloy comprises from 0.3 to 3.5 wt. % copper, more preferably from 0.4 to 2.5 wt. % copper, even more preferably from 0.5 to 1.5 wt. % copper, still even more preferably about 1 wt. % copper. Copper may form copper-tin intermetallics and may contribute to improved mechanical properties, for example strength, through the formation of intermetallic compounds. In addition, the presence of copper may reduce copper dissolution and may also improve creep resistance.

The alloy optionally comprises one or more of
up to 1 wt. % nickel,
up to 1 wt. % cobalt,
up to 1 wt. % titanium,
up to 1 wt. % manganese,
up to 1 wt. % germanium,
up to 10 wt. % aluminum,
up to 10 wt. % silicon.

In a preferred embodiment, the alloy comprises one of these elements. In an alternative preferred embodiment, the alloy comprises two of these elements. In a preferred embodiment, the alloy comprises nickel and one or more of the elements, preferably one of these elements. The alloy preferably comprises nickel and cobalt, or nickel and titanium, or nickel and manganese, or nickel and germanium, or nickel and aluminium, or nickel and silicon.

The alloy optionally comprises up to 1 wt. % nickel, for example from 0.001 to 1 wt. % nickel. Preferably, the alloy comprises from 0.005 to 1 wt. % nickel, more preferably from 0.008 to 0.5 wt. % nickel, even more preferably from 0.015 to 0.1 wt. % nickel, still even more preferably from 0.018 to 0.022 wt. % nickel, still even more preferably about 0.02 wt. % nickel. The presence of nickel in the recited amounts may alter the alloy microstructure, which may improve high temperature mechanical properties. For example, the presence of nickel may facilitate the formation of complex intermetallic compounds and microstructural modification, which in-turn may improve mechanical properties. Nickel may also increase drop shock resistance by decreasing IMC growth at the substrate/solder interface.

The alloy optionally comprises up to 1 wt. % cobalt, for example from 0.001 to 1 wt. % cobalt. Preferably, the alloy comprises from 0.005 to 1 wt. % cobalt, more preferably from 0.008 to 0.5 wt. % cobalt, even more preferably from 0.015 to 0.1 wt. % cobalt. In a preferred embodiment, the alloy comprises from 0.018 to 0.022 wt. % cobalt, for example about 0.02 wt. % cobalt. In an alternative embodiment, the alloy comprises from 0.008 to 0.012 wt. % cobalt, for example about 0.01 wt. % cobalt. The presence of cobalt in the recited amounts may alter the alloy microstructure, which may improve high temperature mechanical properties. For example, the presence of cobalt may facilitate the formation of complex intermetallic compounds and microstructural modification, which in-turn may improve mechanical properties such as high temperature creep and high temperature tensile properties. Cobalt may slow the rate of IMC formation at the substrate/solder interface, and increase drop-shock resistance.

The alloy optionally comprises up to 1 wt. % titanium, for example from 0.001 to 1 wt. % titanium. Preferably, the alloy comprises from 0.003 to 0.5 wt. % titanium, more preferably from 0.005 to 0.1 wt. % titanium, even more preferably from 0.005 to 0.015 wt. % titanium. The presence of titanium in the recited amounts may alter the alloy microstructure, which may improve high temperature mechanical properties. For example, the presence of titanium may facilitate the formation of complex intermetallic compounds and microstructural modification, which in-turn may improve mechanical properties such as high temperature creep and high temperature tensile properties. Titanium may serve to improve strength, interfacial reactions and creep resistance. Titanium may also improve drop shock performance by controlling copper diffusion at the substrate/solder interface.

The alloy optionally comprises up to 1 wt. % manganese, for example from 0.001 to 1 wt. % manganese. Preferably, the alloy comprises from 0.003 to 0.5 wt. % manganese, more preferably from 0.005 to 0.1 wt. % manganese, even more preferably from 0.005 to 0.015 wt. % manganese. The presence of manganese in the recited amounts may alter the alloy microstructure, which may improve high temperature mechanical properties. For example, the presence of manganese may facilitate the formation of complex intermetallic compounds and microstructural modification, which in-turn may improve mechanical properties such as high temperature creep and high temperature tensile properties. Manganese may also improve drop shock and thermal cycling reliability.

The alloy optionally comprises up to 1 wt. % germanium, for example from 0.001 to 1 wt. % germanium. Preferably, the alloy comprises from 0.003 to 0.5 wt. % germanium, more preferably from 0.005 to 0.1 wt. % germanium, even more preferably from 0.005 to 0.015 wt. % germanium. In a preferred embodiment, the alloy comprises from 0.008 to 0.012 wt. % germanium, for example about 0.01 wt. % germanium. The presence of germanium in the recited amounts may alter the alloy microstructure, which may improve high temperature mechanical properties. Germanium may serve to improve strength and interfacial reactions. Germanium may also serve as a deoxidizer. Germanium may improve wettability and spread.

The alloy optionally comprises up to 10 wt. % aluminum, for example from 0.001 to 10 wt. % aluminum. Preferably, the alloy comprises from 0.005 to 5 wt. % aluminum, more preferably from 0.01 to 1 wt. % aluminum, even more preferably from 0.1 to 0.5 wt. % aluminum. The presence of aluminum in the recited amount may improve the thermal and electrical conductivities of the alloy. Aluminum may increase the thermal and electrical conductivity of the individual elements added to the alloy and prevent formation of lower conductivity intermetallics that would result in lower thermal and electrical conductivity. Aluminum may serve as a deoxidizer. Aluminum may also improve wettability of the alloy.

The alloy optionally comprises up to 10 wt. % silicon, for example from 0.001 to 10 wt. % silicon. Preferably, the alloy comprises from 0.005 to 5 wt. % silicon, more preferably from 0.01 to 1 wt. % silicon, even more preferably from 0.1 to 0.5 wt. % silicon. The presence of silicon in the recited amount may improve the thermal and electrical conductivities of the alloy. Silicon may increase the thermal and electrical conductivity of the individual elements added to the alloy and prevent formation of lower conductivity intermetallics that would result in lower thermal and electrical conductivity.

The alloy may optionally contain one or more of up to 1 wt. % gold (e.g. 0.01 to 0.1 wt. %), up to 1 wt. % chromium (e.g. 0.01 to 0.1 wt. %), up to 1 wt. % zinc (e.g. 0.01 to 0.1 wt. %), up to 1 wt. % iron (e.g. 0.01 to 0.1 wt. %), up to 1 wt. % tellurium (e.g. 0.01 to 0.1 wt. %), up to 1 wt. % selenium (e.g. 0.01 to 0.1 wt. %), up to 1 wt. % molybdenum (e.g. 0.01 to 0.1 wt. %), and up to 1 wt. % platinum (e.g. 0.01 to 0.1 wt. %). Such elements may serve as deoxidizers. Such elements may serve to improve strength and interfacial reactions. The presence of zinc may act to improve mechanical properties through solid solution strengthening.

The alloy may optionally contain one or more of up to 1 wt. % phosphorus (e.g. 0.01 to 0.1 wt. %), up to 1 wt. % calcium (e.g. 0.01 to 0.1 wt. %), and up to 1 wt. % vanadium (e.g. 0.01 to 0.1 wt. %). Such elements may serve as deoxidizers. The presence of such elements may improve wettability of the alloy.

The alloy may optionally contain up to 5 wt. % indium (e.g. 0.01 to 1 wt. % indium. The presence of indium may act to improve mechanical properties through solid solution strengthening.

The alloy may optionally contain up to 1 wt. % arsenic (e.g. 0.01 to 0.1 wt. % arsenic. Arsenic may act as an oxidizer and may also improve spread and wettability. Arsenic may also act to improve alloy strength and interfacial reactions.

The alloy may optionally contain up to 1 wt. % gallium (e.g. 0.01 to 0.1 wt. % gallium. The presence of gallium may act to improve mechanical properties through solid solution strengthening. Gallium may also serve as a deoxidizer. Gallium may improve wettability and spread.

The alloy may optionally contain up to 1 wt. % of rare earth element(s) (e.g. 0.01 to 0.1 wt. %). Rare earths may act to improve spread and wettability. Cerium has been found to be particularly effective in this regard.

The alloy will typically comprise at least 70 wt. % tin, more typically at least 75 wt. % tin, still more typically at least 80 wt. % tin.

In a preferred embodiment the alloy comprises from 9 to 11 wt. % antimony, from 0.5 to 1.5 wt. % bismuth, from 2.5 to 3.5 wt. % silver, from 0.5 to 1.5 wt. % copper, from 0.01 to 0.05 wt. % nickel and the balance tin and any unavoidable impurities.

In a preferred embodiment the alloy comprises from 9 to 11 wt. % antimony, from 0.5 to 1.5 wt. % bismuth, from 3.5 to 4.5 wt. % silver, from 0.5 to 1.5 wt. % copper, from 0.01 to 0.05 wt. % nickel and the balance tin and any unavoidable impurities.

In a preferred embodiment the alloy comprises from 9 to 11 wt. % antimony, from 0.2 to 0.8 wt. % bismuth, from 2.5 to 3.5 wt. % silver, from 0.5 to 1.5 wt. % copper, from 0.01 to 0.05 wt. % nickel, optionally, from 0.005 to 0.07 wt. % germanium, and the balance tin and any unavoidable impurities.

In a preferred embodiment the alloy comprises from 9 to 11 wt. % antimony, from 0.1 to 0.4 wt. % bismuth, from 2.5 to 3.5 wt. % silver, from 0.5 to 1.5 wt. % copper, from 0.01 to 0.05 wt. % nickel, optionally, from 0.005 to 0.015 wt. % germanium, and the balance tin and any unavoidable impurities.

In a preferred embodiment the alloy comprises from 9 to 11 wt. % antimony, from 0.1 to 0.4 wt. % bismuth, from 2.5 to 3.5 wt. % silver, from 0.5 to 1.5 wt. % copper, from 0.01 to 0.05 wt. % nickel, and at least one of (i) from 0.005 to 0.015 wt. % manganese, (ii) from 0.005 to 0.015 wt. % titanium, or (iii) from 0.01 to 0.08 wt. % cobalt, and the balance tin and any unavoidable impurities.

In a preferred embodiment the alloy comprises from 9 to 11 wt. % antimony, from 0.05 to 0.2 wt. % bismuth, from 3.5 to 4.5 wt. % silver, from 0.5 to 1.5 wt. % copper, from 0.01 to 0.05 wt. % nickel, from 0.005 to 0.05 wt. % cobalt and the balance tin and any unavoidable impurities.

In a preferred embodiment the alloy comprises from 9 to 11 wt. % antimony, from 0.05 to 0.2 wt % bismuth, from 2.5 to 3.5 wt. % silver, from 0.5 to 1.5 wt. % copper, from 0.01 to 0.05 wt. % nickel, from 0.005 to 0.05 wt. % titanium and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt. % germanium, from 0.005 to 0.015 wt. % manganese and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt. % germanium, from 0.005 to 0.015 wt. % titanium and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt. % germanium, from 0.005 to 0.05 wt. % cobalt and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt. % titanium, from 0.005 to 0.015 wt. % manganese and the balance tin and any unavoidable impurities.

In a preferred embodiment the alloy comprises from 9 to 11 wt. % antimony, from 0.05 to 0.2 wt % bismuth, from 2.5 to 3.5 wt. % silver, from 0.5 to 1.5 wt. % copper, from 0.005 to 0.05 wt. % cobalt and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt. % titanium, from 0.005 to 0.05 wt. % cobalt and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.01 to 0.05 wt. % nickel, from 0.005 to 0.015 wt. % manganese, from 0.01 to 0.05 wt. % aluminum, from 0.01 to 0.05 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.01 to 0.05 wt. % nickel, from 0.005 to 0.015 wt. % manganese, from 0.05 to 0.5 wt. % aluminum, from 0.05 to 0.5 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.01 to 0.05 wt. % nickel, from 0.005 to 0.015 wt. % manganese, from 1 to 3 wt. % aluminum, from 1 to 3 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.01 to 0.05 wt. % nickel, from 0.005 to 0.05 wt. % cobalt, from 0.01 to 0.05 wt. % aluminum, from 0.01 to 0.05 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.01 to 0.05 wt. % nickel, from 0.005 to 0.05 wt. % cobalt, from 0.05 to 0.5 wt. % aluminum, from 0.05 to 0.5 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.01 to 0.05 wt. % nickel, from 0.005 to 0.05 wt. % cobalt, from 1 to 3 wt. % aluminum, from 1 to 3 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.01 to 0.05 wt. % nickel, from 0.005 to 0.015 wt. % manganese, from 0.005 to 0.05 wt % cobalt, from 0.05 to 0.5 wt. % aluminum, from 0.05 to 0.5 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt % manganese, from 0.01 to 0.05 wt. % aluminum, from 0.01 to 0.05 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt. % manganese, from 0.05 to 0.5 wt. % aluminum, from 0.05 to 0.5 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt. % manganese, from 1 to 3 wt. % aluminum, from 1 to 3 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.05 wt. % cobalt, from 0.01 to 0.05 wt. % aluminum, from 0.01 to 0.05 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.05 wt. % cobalt, from 0.05 to 0.5 wt. % aluminum, from 0.05 to 0.5 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.05 wt. % cobalt, from 1 to 3 wt. % aluminum, from 1 to 3 wt. % silicon and the balance tin and any unavoidable impurities.

In a preferred embodiment the alloy comprises from 9 to 11 wt. % antimony, from 0.05 to 0.2 wt. % bismuth, from 2.5 to 3.5 wt. % silver, from 0.5 to 1.5 wt. % copper, from 0.005 to 0.015 wt. % manganese, from 0.005 to 0.05 wt. % cobalt, from 0.05 to 0.5 wt % aluminum, from 0.05 to 0.5 wt. % silicon and the balance tin and any unavoidable impurities.

The alloy preferably has a solidus temperature of 215° C. or more. This enables the alloy to be used advantageously in high operation temperature applications.

It will be appreciated that the alloys described herein may contain unavoidable impurities, although, in total, these are unlikely to exceed 1 wt. % of the composition. Preferably, the alloys contain unavoidable impurities in an amount of not more than 0.5 wt. % of the composition, more preferably not more than 0.3 wt. % of the composition, still more preferably not more than 0.1 wt. % of the composition, still more preferably not more than 0.05 wt. % of the composition, and most preferably not more than 0.02 wt. % of the composition.

The alloys described herein may consist essentially of the recited elements. It will therefore be appreciated that in addition to those elements that are mandatory other non-specified elements may be present in the composition provided that the essential characteristics of the composition are not materially affected by their presence.

In a preferred embodiment, the solder is in the form of a bar, a stick, a solid or flux cored wire, a foil or strip, a film, a preform, or a powder or paste (i.e., a powder plus flux blend), or solder spheres for use in ball grid array joints or chip scale packages, or other pre-formed solder pieces, or a reflowed or solidified solder joint, or pre-applied on any solderable material such as a copper ribbon.

In a preferred embodiment the alloys is in the form of a paste. The paste typically comprises particles of the solder alloy (typically in the form of a powder) and a flux.

In a preferred embodiment, the solder alloy is in the form of a preform. A preform is a pre-made shape of solder specially designed for the application where it is to be used. Many methods may be used to manufacture the solder preform, for example stamping. The preform may comprise flux. The flux may be an internal flux insider the solder preform or an external flux coating the solder preform.

In a further aspect, the present invention provides a solder joint comprising the alloy as described herein.

In a further aspect, the present invention provides a High Brightness LED (HBLED), motor control, solar concentrator cell, RF circuit or microwave circuit comprising the solder joint as described herein.

In a further aspect, the present invention provides a method of forming a solder joint comprising:
 (i) providing two or more work pieces to be joined;
 (ii) providing a solder alloy as described herein; and
 (iii) heating the solder alloy in the vicinity of the work pieces to be joined.

The heating may be carried out, for example, at a temperature of greater than 125° C., for example greater than 150° C. or greater than 200° C. or greater than 220° C.

In a further aspect, the present invention provides use of the alloy as described herein in a soldering method such as wave soldering, Surface Mount Technology (SMT) soldering, die attach soldering, thermal interface soldering, hand soldering, laser and RF induction soldering, soldering to a solar module, soldering of LED package boards, and rework soldering.

In a further aspect, the present invention provides use of the alloy as described herein in soldering on power modules, for applications including but not limited to an electric vehicle (EV), hybrid electric vehicle (HEV), a motor drive, a power inverter, a wind turbine or a rail traction system.

In a further aspect, the present invention provides use of the alloy as described herein in die attach soldering, vacuum soldering, wave soldering, selective soldering, surface mount technology soldering, thermal interface soldering, hand soldering, laser and RF induction soldering, soldering to a solar module, soldering of LED package-board, and rework soldering.

In a further aspect, the present invention provides use of the solder described herein in a soldering method, the soldering method comprising heating the alloy to a temperature of 220° C. or greater.

In a further aspect, the present invention provides a lead-free solder alloy comprising:
 from 4 to 17 wt. % antimony, preferably 8 to 15 wt. % antimony,
 from 0.05 to 5 wt. % bismuth,
 from 0.1 to 10 wt. % silver,
 from 0.1 to 4 wt. % copper,
 optionally one or more of
 up to 1 wt. % nickel,
 up to 1 wt. % cobalt,
 up to 1 wt. % titanium,
 up to 1 wt. % manganese,
 up to 1 wt. % germanium,
 up to 10 wt. % aluminum, up to 10 wt. % silicon,
up to 5 wt. % indium,
up to 1 wt. % chromium,
up to 1 wt. % zinc,
up to 1 wt. % arsenic,
up to 1 wt. % iron,
up to 1 wt. % phosphorus,
up to 1 wt. % gold,
up to 1 wt. % gallium,
up to 1 wt. % tellurium,
up to 1 wt. % selenium,
up to 1 wt. % calcium,
up to 1 wt. % vanadium,
up to 1 wt. % molybdenum,
up to 1 wt. % platinum,
up to 1 wt. % rare earth elements,
the balance tin and any unavoidable impurities.

The advantages, optional features and preferred features of the other aspects of the present invention apply equally to this aspect. In one embodiment, the alloy may be free of bismuth.

In a further aspect, the present invention provides a lead-free solder alloy comprising:
from 8 to 15 wt. % antimony,
optionally one or more of
from 0.05 to 5 wt. % bismuth,
from 0.5 to 5 wt. % silver,
from 0.1 to 2 wt. % copper,
up to 1 wt. % nickel,
up to 1 wt. % cobalt,
up to 1 wt. % titanium,
up to 1 wt. % manganese,
up to 1 wt. % germanium,
up to 5 wt. % aluminum,
up to 5 wt. % silicon,
Up to 5 wt. % indium,
up to 1 wt. % chromium,
up to 1 wt. % zinc,
up to 1 wt. % arsenic,
up to 1 wt. % iron,
up to 1 wt. % phosphorus,
up to 1 wt. % gold,
up to 1 wt. % gallium,
up to 1 wt. % tellurium,
up to 1 wt. % selenium,
up to 1 wt. % calcium,
up to 1 wt. % vanadium,
up to 1 wt. % molybdenum,
up to 1 wt. % platinum,
up to 1 wt. % rare earth elements,
the balance tin and any unavoidable impurities.

The advantages, optional features and preferred features of the other aspects of the present invention apply equally to this aspect.

The present invention will now be described further, by way of a few non-limiting examples of these alloys and a summary of their performance.

Table 1 shows solidus and liquidus temperatures of selected alloys according to the present invention.

TABLE 1

Solidus and Liquidus Temperatures of Selected Alloys

| Example | Solidus temperature, ° C. | Liquidus temperature, ° C. |
|---|---|---|
| A0 | 222 | 266 |
| A1 | 220 | 264 |
| A2 | 220 | 262 |
| A3 | 220 | 266 |
| A4 | 220.8 | 264.2 |
| A5 | 221.2 | 269 |
| A8 | 221.2 | 262.2 |
| A9 | 221 | 265 |
| A10 | 220.6 | 265.9 |
| A11 | 220.8 | 266.1 |
| A12 | 222 | 270 |
| A13 | 223 | 251 |
| A14 | 222 | 238 |
| A19 | 220 | 264 |
| A20 | 220 | 262 |
| A21 | 216 | 261 |

Example 1-A1

Figure 9:
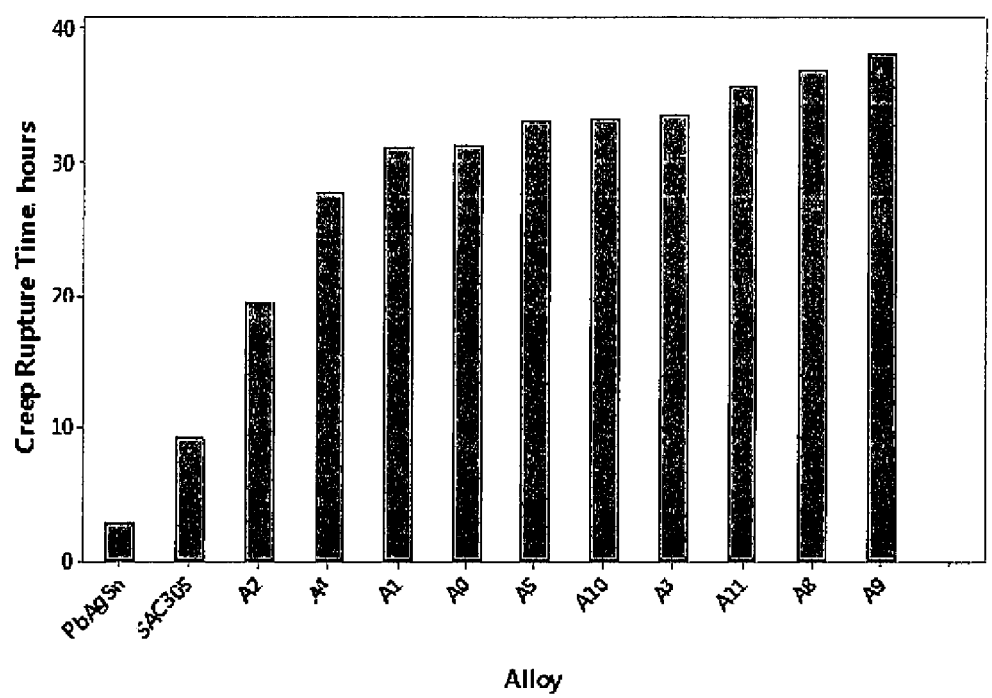
FIG. 9 shows plots of the creep properties at 150° C. of selected alloys according to the present invention.

A1 comprises 10 wt. % antimony, 1 wt. % bismuth, 3 wt. % silver, 1 wt. % copper, 0.02 wt. % nickel and the balance tin together with unavoidable impurities. A1 has solidus and liquidus temperatures of 220 and 264° C. (Table 1), respectively, and an average creep rupture time of 31.1 hours (FIG. 9). Please note that the solidus and liquidus temperatures of alloys we measured using a Differential Scanning calorimetry (DSC) test at a heating rate of 10° per min. The creep rupture time was measured at 150° C. and 200 N of load, unless otherwise stated.

Example 2-A2

A2 comprises approximately 10 wt. % antimony, 1 wt. % bismuth, 4 wt. % silver, 1 wt. % copper, 0.02 wt. % nickel and the balance tin together with unavoidable impurities. A2 has a melting range of 220 and 262° C. (Table 1); and an average creep rupture time of 19.5 hours (FIG. 9).

Example 3-A3

A3 comprises approximately 10 wt. % antimony, 0.5 wt. % bismuth, 3 wt % silver, 1 wt. % copper, 0.02 wt. % nickel and the balance tin together with unavoidable impurities. A3 has a melting range of 220 and 266° C. (Table 1); and an average creep rupture time of 33.3 hours (FIG. 9).

Example 4-A4

A4 comprises approximately 10 wt. % antimony, 0.5 wt. % bismuth, 3 wt. % silver, 1 wt. % copper, 0.02 wt. % nickel, 0.04 wt. % germanium and the balance tin together with unavoidable impurities. A4 has a creep rupture time of 27.2 hours (FIG. 9).

Example 5-A5

A5 comprises approximately 10 wt. % antimony, 0.25 wt. % bismuth, 3 wt. % silver, 1 wt. % copper, 0.02 wt. % nickel and the balance tin together with unavoidable impurities. A5 has a creep rupture time of 31.4 hours (FIG. 9).

Example 6-A6

A6 comprises approximately 10 wt. % antimony, 0.25 wt. % bismuth, 3 wt. % silver, 1 wt. % copper, 0.02 wt. % nickel, 0.01 wt. % germanium and the balance tin together with unavoidable impurities. A6 has creep a rupture time of 33 hours (FIG. 9).

Example 7-A7

A7 comprises approximately 10 wt. % antimony, 0.25 wt. % bismuth, 3 wt. % silver, 1 wt. % copper, 0.02 wt. % nickel, 0.01 wt. % manganese and the balance tin together with unavoidable impurities. A7 has a creep rupture time of 28.3 hours (FIG. 9).

Example 8-A8

A8 comprises approximately 10 wt. % antimony, 0.25 wt. % bismuth, 3 wt. % silver, 1 wt. % copper, 0.02 wt. % nickel, 0.01 wt. % titanium and the balance tin together with unavoidable impurities. A8 has a creep rupture time of 36.9 hours (FIG. 9).

Example 9-A9

A9 comprises approximately 10 wt. % antimony, 0.25 wt. % bismuth, 3 wt. % silver, 1 wt. % copper, 0.02 wt. % nickel, 0.02 wt. % cobalt and the balance tin together with unavoidable impurities. A9 has a creep rupture time of 38 hours (FIG. 9).

Example 10-A10

A10 comprises approximately 10 wt. % antimony, 0.1 wt. % bismuth, 4 wt. % silver, 1 wt. % copper, 0.02 wt. % nickel, 0.01 wt. % cobalt and the balance tin together with unavoidable impurities. A10 has a creep rupture time of 31.6 hours (FIG. 9).

Example 11-A11

A11 comprises approximately 10 wt. % antimony, 0.1 wt. % bismuth, 3 wt. % silver, 1 wt. % copper, 0.02 wt. % nickel, 0.02 wt. % titanium and the balance tin together with unavoidable impurities. A11 has a creep rupture time of 36.2 hours (FIG. 9).

Example 12-A12

Figure 5:
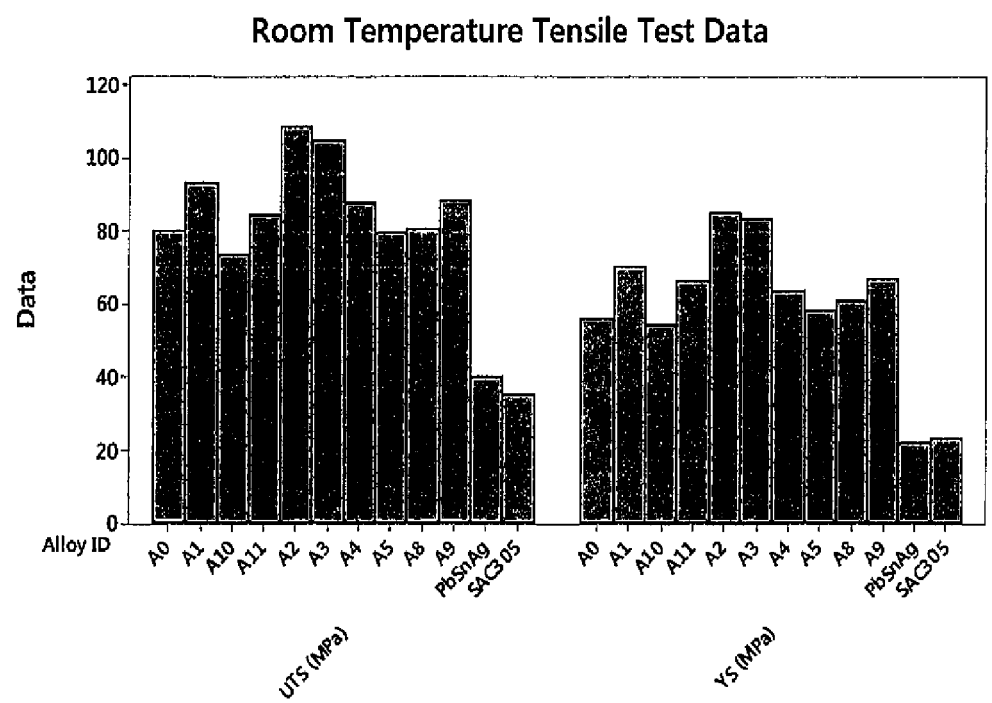
FIG. 5 shows plots of the room temperature tensile properties of selected alloys according to the present invention.

A12 comprises approximately 10 wt. % antimony, 0.1 wt. % bismuth, 3 wt. % silver, 0.1 wt. % copper, 0.02 wt. % nickel, 0.01 wt. % cobalt and the balance tin together with unavoidable impurities. A12 has a melting range of 220 and 272° C. (Table 1); an average creep rupture time of 63.3 hours (FIG. 9); and room temperature tensile strength of 97.3 MPa (FIG. 5). Please note that ultimate tensile strength (UTS) and yield strength (YS) were measured here at room temperature or 150° C. (please refer to the corresponding Figure for details), using strain rate of $10^{-3}$ (see ASTM E8/E8M-09 for test methods of tensile measurement).

Example 13-A13

A13 comprises approximately 10 wt. % antimony, 0.1 wt. % bismuth, 3 wt. % silver, 0.1 wt. % copper, 0.02 wt. % nickel, 0.5 wt. % aluminum and the balance tin together with unavoidable impurities. A13 has a melting range of 223 and 251° C. (Table 1); an average creep rupture time of 41.5 hours (FIG. 9); and room temperature tensile strength of 83.9 MPa (FIG. 5).

Example 14-A14

A14 comprises approximately 10 wt. % antimony, 0.1 wt. % bismuth, 3 wt. % silver, 0.1 wt. % copper, 0.02 wt. % nickel, 0.5 wt. % aluminum and the balance tin together with unavoidable impurities. A14 has a melting range of 222 and 238° C. (Table 1); an average creep rupture time of 57.5 hours (FIG. 9); and room temperature tensile strength of 91.1 MPa (FIG. 5).

Examples 15 to 100

A number of further example alloys were prepared, with the compositions as set out in Table 2. All these alloys have exhibited solidus temperatures of at least 220° C. and favorable high temperature mechanical reliability and thermal fatigue resistance.

Table 2 shows alloy composition of examples A15 to A100 according to the present invention.

TABLE 2

Alloy Compositions of Examples A15 to A100

| Ex. | Sn Wt. % | Sb Wt. % | Ag Wt. % | Cu Wt. % | Bi Wt. % | Ni Wt. % | Ge Wt. % | Mn Wt. % | Ti Wt. % | Co Wt. % | Al Wt. % | Si Wt. % |
|---|---|---|---|---|---|---|---|---|---|---|---|---|
| 15 | 92.0 | 8.0 | | | | | | | | | | |
| 16 | 90.0 | 10.0 | | | | | | | | | | |
| 17 | 88.0 | 12.0 | | | | | | | | | | |
| 18 | 85.0 | 15.0 | | | | | | | | | | |
| 19 | 87.0 | 10.0 | 3.0 | | | | | | | | | |
| 20 | 86.0 | 10.0 | 4.0 | | | | | | | | | |
| 21 | 85.0 | 10.0 | 5.0 | | | | | | | | | |
| 22 | 82.0 | 15.0 | 3.0 | | | | | | | | | |
| 23 | 81.0 | 15.0 | 4.0 | | | | | | | | | |
| 24 | 80.0 | 15.0 | 5.0 | | | | | | | | | |
| 25 | 86.0 | 10.0 | 3.0 | 1.0 | | | | | | | | |
| 26 | 81.0 | 15.0 | 3.0 | 1.0 | | | | | | | | |
| 27 | 85.0 | 10.0 | 3.0 | 1.0 | 1.0 | | | | | | | |
| 28 | 80.0 | 15.0 | 3.0 | 1.0 | 1.0 | | | | | | | |
| 29 | 84.0 | 10.0 | 3.0 | 1.0 | 2.0 | | | | | | | |
| 30 | 83.0 | 10.0 | 3.0 | 1.0 | 3.0 | | | | | | | |
| 31 | 82.0 | 10.0 | 3.0 | 1.0 | 4.0 | | | | | | | |
| 32 | 81.0 | 10.0 | 3.0 | 1.0 | 5.0 | | | | | | | |
| 33 | 84.0 | 10.0 | 4.0 | 1.0 | 1.0 | | | | | | | |
| 34 | 83.0 | 10.0 | 5.0 | 1.0 | 1.0 | | | | | | | |
| 35 | 85.98 | 10.0 | 3.0 | 1.0 | 0.0 | 0.02 | | | | | | |

TABLE 2-continued

Alloy Compositions of Examples A15 to A100

| Ex. | Sn Wt. % | Sb Wt. % | Ag Wt. % | Cu Wt. % | Bi Wt. % | Ni Wt. % | Ge Wt. % | Mn Wt. % | Ti Wt. % | Co Wt. % | Al Wt. % | Si Wt. % |
|---|---|---|---|---|---|---|---|---|---|---|---|---|
| 36 | 84.98 | 10.0 | 3.0 | 1.0 | 1.0 | 0.02 | | | | | | |
| 37 | 83.98 | 10.0 | 4.0 | 1.0 | 1.0 | 0.02 | | | | | | |
| 38 | 83.98 | 10.0 | 3.0 | 1.0 | 2.0 | 0.02 | | | | | | |
| 39 | 82.98 | 10.0 | 4.0 | 1.0 | 2.0 | 0.02 | | | | | | |
| 40 | 82.98 | 10.0 | 4.0 | 1.0 | 2.0 | 0.02 | | | | | | |
| 41 | 87.98 | 5.0 | 4.0 | 1.0 | 2.0 | 0.02 | | | | | | |
| 42 | 89.98 | 5.0 | 3.0 | 1.0 | 1.0 | 0.02 | | | | | | |
| 43 | 85.48 | 10.0 | 3.0 | 1.0 | 0.5 | 0.02 | | | | | | |
| 44 | 84.48 | 10.0 | 4.0 | 1.0 | 0.5 | 0.02 | | | | | | |
| 45 | 87.98 | 7.5 | 3.0 | 1.0 | 0.5 | 0.02 | | | | | | |
| 46 | 88.98 | 7.5 | 2.5 | 0.5 | 0.5 | 0.02 | | | | | | |
| 47 | 85.98 | 10.0 | 2.5 | 1.0 | 0.5 | 0.02 | | | | | | |
| 48 | 86.48 | 10.0 | 2.5 | 0.5 | 0.5 | 0.02 | | | | | | |
| 49 | 85.48 | 10.0 | 3.0 | 1.0 | 0.5 | 0.02 | 0.004 | | | | | |
| 50 | 85.73 | 10.0 | 3.0 | 1.0 | 0.3 | 0.02 | | | | | | |
| 51 | 85.73 | 10.0 | 3.0 | 1.0 | 0.3 | 0.02 | 0.004 | | | | | |
| 52 | 85.73 | 10.0 | 3.0 | 1.0 | 0.3 | 0.02 | | | | | | |
| 53 | 85.72 | 10.0 | 3.0 | 1.0 | 0.3 | 0.02 | | | 0.01 | | | |
| 54 | 85.71 | 10.0 | 3.0 | 1.0 | 0.3 | 0.02 | | | | 0.02 | | |
| 55 | 85.87 | 10.0 | 3.0 | 1.0 | 0.1 | 0.02 | | 0.01 | | | | |
| 56 | 84.86 | 10.0 | 4.0 | 1.0 | 0.1 | 0.02 | | | | 0.02 | | |
| 57 | 85.88 | 10.0 | 3.0 | 1.0 | 0.1 | 0.02 | | | | | | |
| 58 | 85.72 | 10.0 | 3.0 | 1.0 | 0.3 | 0.02 | | 0.01 | | | | |
| 59 | 85.86 | 10.0 | 3.0 | 1.0 | 0.1 | 0.02 | | | | 0.02 | | |
| 60 | 85.72 | 10.0 | 3.0 | 1.0 | 0.3 | 0.02 | 0.004 | | 0.01 | | | |
| 61 | 85.71 | 10.0 | 3.0 | 1.0 | 0.3 | 0.02 | 0.004 | | | 0.02 | | |
| 62 | 85.89 | 10.0 | 3.0 | 1.0 | 0.1 | | 0.004 | 0.01 | | | | |
| 63 | 85.89 | 10.0 | 3.0 | 1.0 | 0.1 | | 0.004 | | 0.01 | | | |
| 64 | 85.88 | 10.0 | 3.0 | 1.0 | 0.1 | | 0.004 | | | 0.02 | | |
| 65 | 85.88 | 10.0 | 3.0 | 1.0 | 0.1 | | | 0.01 | 0.01 | 0.0 | | |
| 66 | 85.88 | 10.0 | 3.0 | 1.0 | 0.1 | | | | | 0.02 | | |
| 67 | 85.87 | 10.0 | 3.0 | 1.0 | 0.1 | | | | 0.01 | 0.02 | | |
| 68 | 85.83 | 10.0 | 3.0 | 1.0 | 0.1 | 0.02 | | 0.01 | | | 0.02 | 0.02 |
| 69 | 85.67 | 10.0 | 3.0 | 1.0 | 0.1 | 0.02 | | 0.01 | | | 0.1 | 0.1 |
| 70 | 81.87 | 10.0 | 3.0 | 1.0 | 0.1 | 0.02 | | 0.01 | | | 2.0 | 2.0 |
| 71 | 85.82 | 10.0 | 3.0 | 1.0 | 0.1 | 0.02 | | | | 0.02 | 0.02 | 0.02 |
| 72 | 85.66 | 10.0 | 3.0 | 1.0 | 0.1 | 0.02 | | | | 0.02 | 0.1 | 0.1 |
| 73 | 81.86 | 10.0 | 3.0 | 1.0 | 0.1 | 0.02 | | | | 0.02 | 2.0 | 2.0 |
| 74 | 85.65 | 10.0 | 3.0 | 1.0 | 0.1 | 0.02 | | 0.01 | | 0.02 | 0.1 | 0.1 |
| 75 | 85.88 | 10.0 | 3.0 | 1.0 | 0.1 | 0.02 | | | | | 0.1 | |
| 76 | 85.88 | 10.0 | 3.0 | 1.0 | 0.1 | 0.02 | | | | | 0.02 | |
| 77 | 85.88 | 10.0 | 3.0 | 1.0 | 0.1 | 0.02 | | | | | 0.1 | |
| 78 | 85.88 | 10.0 | 3.0 | 1.0 | 0.1 | 0.02 | | | | | 0.5 | |
| 79 | 85.88 | 10.0 | 3.0 | 1.0 | 0.1 | 0.02 | | | | | 0.75 | |
| 80 | 85.88 | 10.0 | 3.0 | 1.0 | 0.1 | 0.02 | | | | | 1.0 | |
| 81 | 85.88 | 10.0 | 3.0 | 1.0 | 0.1 | 0.02 | | | | | 3.0 | |
| 82 | 85.88 | 10.0 | 3.0 | 1.0 | 0.1 | 0.02 | | | | | 5.0 | |
| 83 | 86.78 | 10.0 | 3.0 | 0.1 | 0.1 | 0.02 | | | | | 0.02 | |
| 84 | 86.78 | 10.0 | 3.0 | 0.1 | 0.1 | 0.02 | | | | | 0.1 | |
| 85 | 86.78 | 10.0 | 3.0 | 0.1 | 0.1 | 0.02 | | | | | 0.5 | |
| 86 | 86.78 | 10.0 | 3.0 | 0.1 | 0.1 | 0.02 | | | | | 0.75 | |
| 87 | 86.78 | 10.0 | 3.0 | 0.1 | 0.1 | 0.02 | | | | | 1.0 | |
| 88 | 86.80 | 10.0 | 3.0 | 0.1 | 0.1 | | | | | | 0.02 | |
| 89 | 86.80 | 10.0 | 3.0 | 0.1 | 0.1 | | | | | | 0.1 | |
| 90 | 86.80 | 10.0 | 3.0 | 0.1 | 0.1 | | | | | | 0.5 | |
| 91 | 86.80 | 10.0 | 3.0 | 0.1 | 0.1 | | | | | | 0.75 | |
| 92 | 86.80 | 10.0 | 3.0 | 0.1 | 0.1 | | | | | | 1.0 | |
| 93 | 86.78 | 10.0 | 3.0 | 0.1 | 0.1 | 0.02 | 0.004 | | | | 0.1 | |
| 94 | 86.77 | 10.0 | 3.0 | 0.1 | 0.1 | 0.02 | | 0.01 | | | 0.1 | |
| 95 | 86.77 | 10.0 | 3.0 | 0.1 | 0.1 | 0.02 | | | 0.01 | | 0.1 | |
| 96 | 86.76 | 10.0 | 3.0 | 0.1 | 0.1 | 0.02 | | | | 0.02 | 0.1 | |
| 97 | 86.78 | 10.0 | 3.0 | 0.1 | 0.1 | 0.02 | 0.004 | | | | 0.5 | |
| 98 | 86.77 | 10.0 | 3.0 | 0.1 | 0.1 | 0.02 | | 0.01 | | | 0.5 | |
| 99 | 86.77 | 10.0 | 3.0 | 0.1 | 0.1 | 0.02 | | | 0.01 | | 0.5 | |
| 100 | 86.76 | 10.0 | 3.0 | 0.1 | 0.1 | 0.02 | | | | 0.02 | 0.5 | |

FIG. 1 shows the microstructure of alloy A1 to A3. Four different phase constituents are identified by using SEM-EDS: (1) Sn-rich solid solution (more than 90% of Sn) (2) SnSb phase (Contains Sn up to 55 wt. % and Sb up to 45 wt. %) (3) Ag$_3$Sn and (4) Cu$_6$Sn$_5$.

Figure 2:
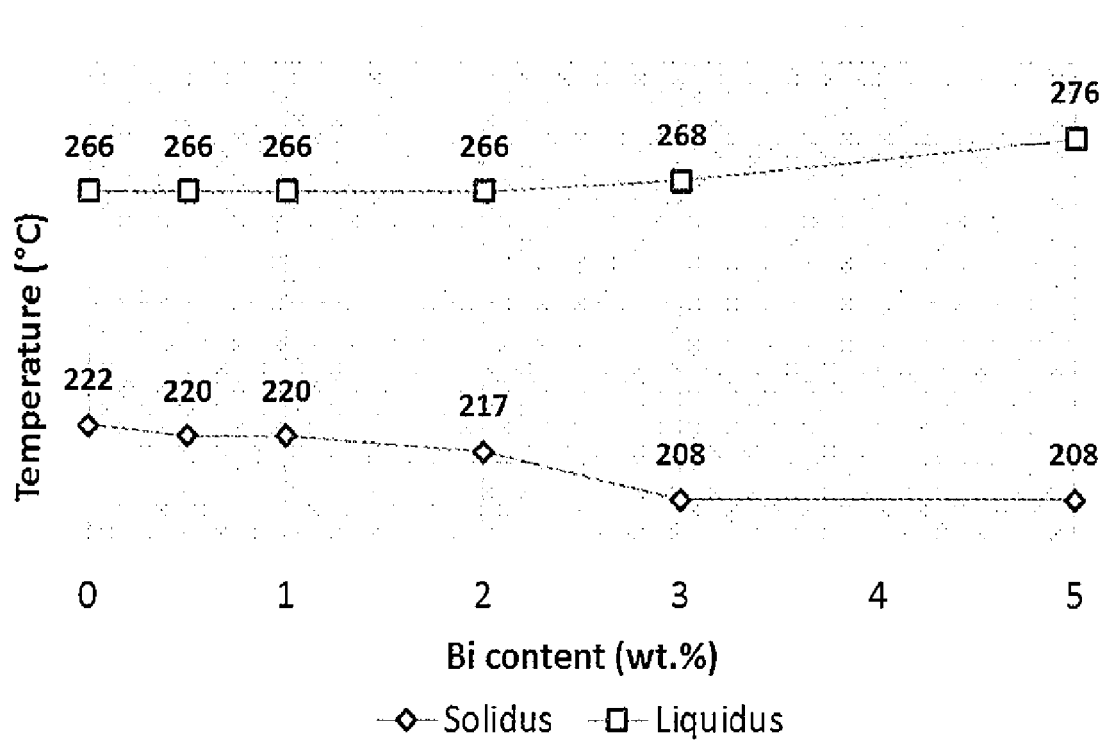
FIG. 2 shows solidus and liquidus temperatures of Sn—Ag—Cu—Sb—Bi alloys with varying Bi.
Figure 3:
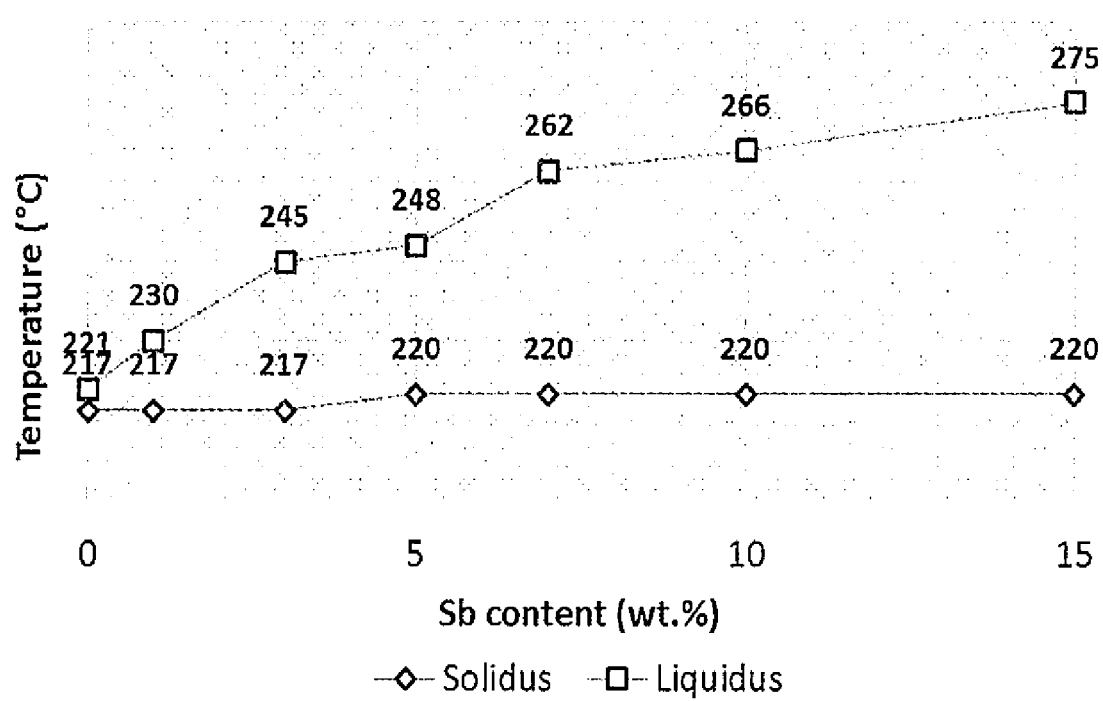
FIG. 3 shows solidus and liquidus temperatures of Sn—Ag—Cu—Sb—Bi alloys with varying Sb.
Figure 4:
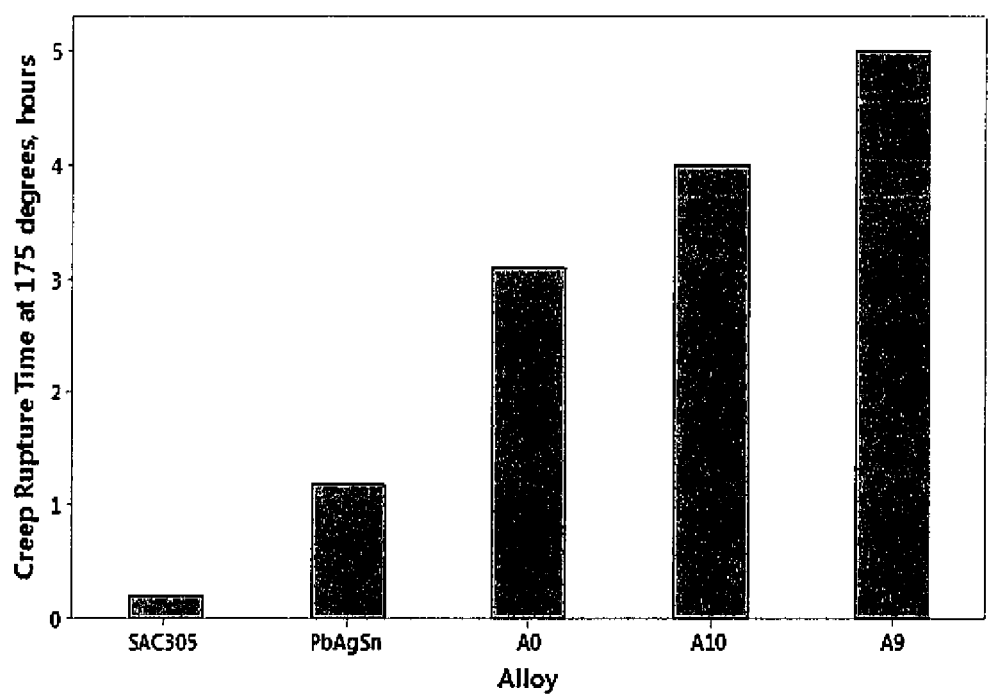
FIG. 4 shows plots of the creep properties at 175° C. of selected alloys according to the present invention.

FIGS. 2 and 3 illustrate solidus and liquidus temperatures of alloys of present invention with varying Bi and Sb content, respectively. Adding more than 2 wt. % of Bi to Sn—Ag—Cu—Sb, drastically reduce the solidus temperature, which further hamper the use of proposed alloy at high operating temperature applications. On the other hand, Sb of more than 7.5% is required to get an alloy with high operational temperature and that reflows at 280-300° C. peak temperature. Further to understand the effect of Ag and Cu, melting temperatures of selected Sn—Ag—Cu—Sb—Bi alloys (optimized Bi and Sb) were presented in Table 1. From these results, it is well evident that the liquidus temperature is somewhat influenced by the copper content. For example, A12 is an alloy with lower copper, has shown higher liquidus temperature. On the other hand, increasing Ag content does not change the liquidus temperature. For example, A19 to A21 are alloys with varying levels of Ag addition, but the melting temperature range varies little. For the practical applications that are covered in the present invention, an ideal alloy will have liquidus temperature below 265° C., such that it can reflow at 280-300° C. peak reflow. In addition to that, its desired solidus temperature will be above 220° C. and its desired liquidus temperature will be above 240° C., such the said resulting solder joint will have high fatigue life at operational temperatures above 150° C., as exemplified in FIG. 4.

Figure 6:
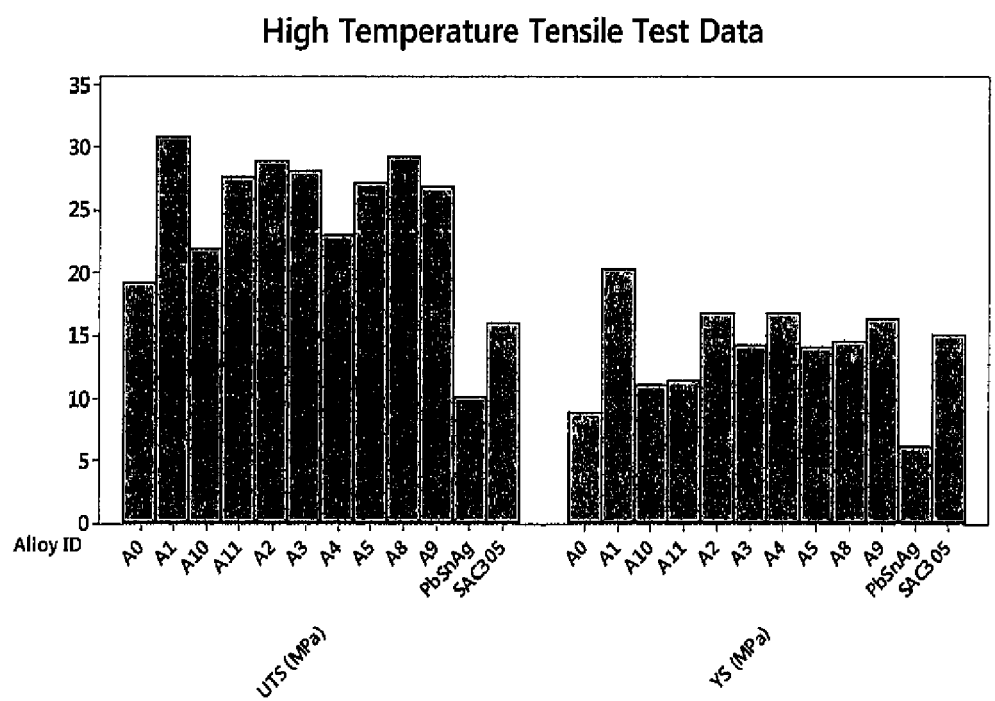
FIG. 6 shows plots of the high temperature (150° C.) tensile properties of selected alloys according to the present invention.
Figure 7:
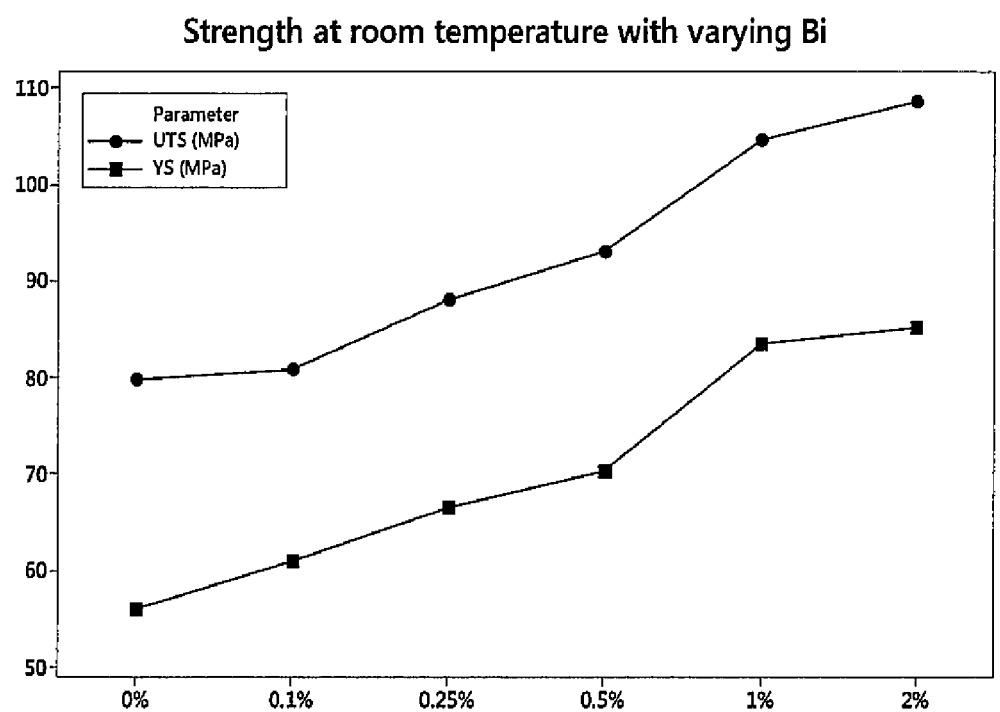
FIG. 7 shows the effect of Bi on room tensile strength of alloys according to the present invention.
Figure 8:
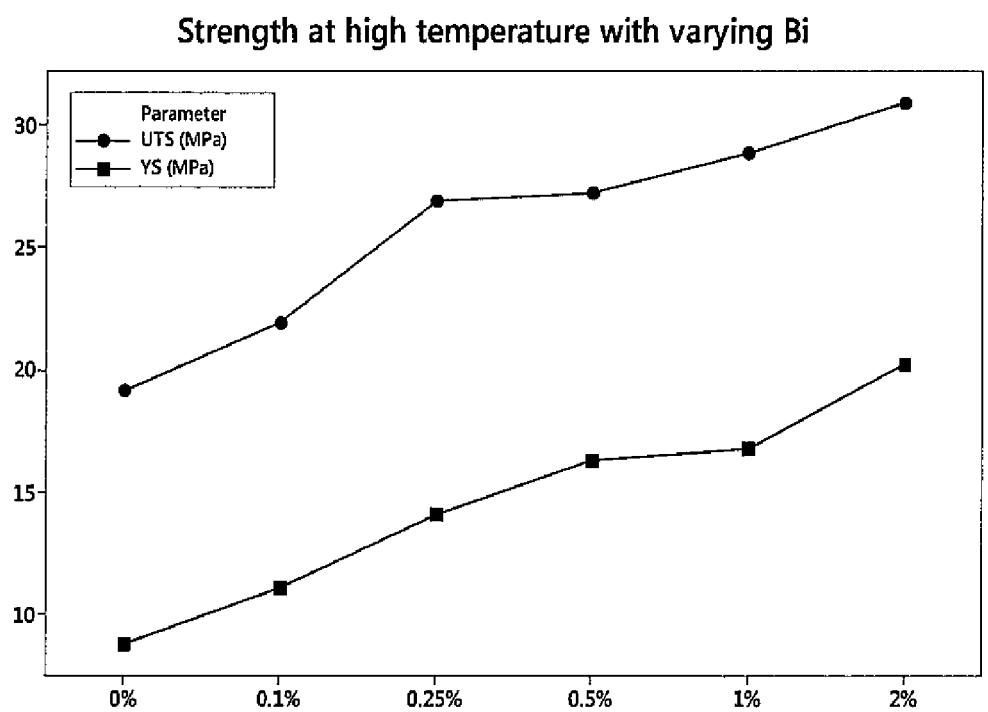
FIG. 8 shows the effect of Bi on high temperature tensile strength of alloys according to the present invention.

The room temperature and high temperature (150° C.) tensile properties were measured, and the selected results are shown in FIGS. 5 to 8. It is well evident that the strength of present alloys is far superior compared to that of the conventional high lead alloy, such as 92.5Pb5Sn2.5Ag (referred in the figure as PbSnAg). In addition, the strength of alloys can be increased by adding higher bismuth to Sn—Ag—Cu—Sb—Bi (FIGS. 7 and 8). For example, A1 to A3 are alloys with higher bismuth content compare to other examples; A1 to A3 possess higher strength at both room temperature and high temperature (FIGS. 5 and 6).

The creep rupture time of alloys were measured, and the selected results are shown in FIG. 9. It is well evident that an alloy with an optimized bismuth and with at least two minor alloying additions are essential to impart higher creep rupture time. For example, A9 is an alloy with optimized Bi content and two minor additions, has shown highest creep rupture time compare to all other alloys. Creep rupture time of A9 is nearly 18 times higher than that of the existing 92.5Pb5Sn2.5Ag (referred in the figure as PbSnAg).

Figure 10:
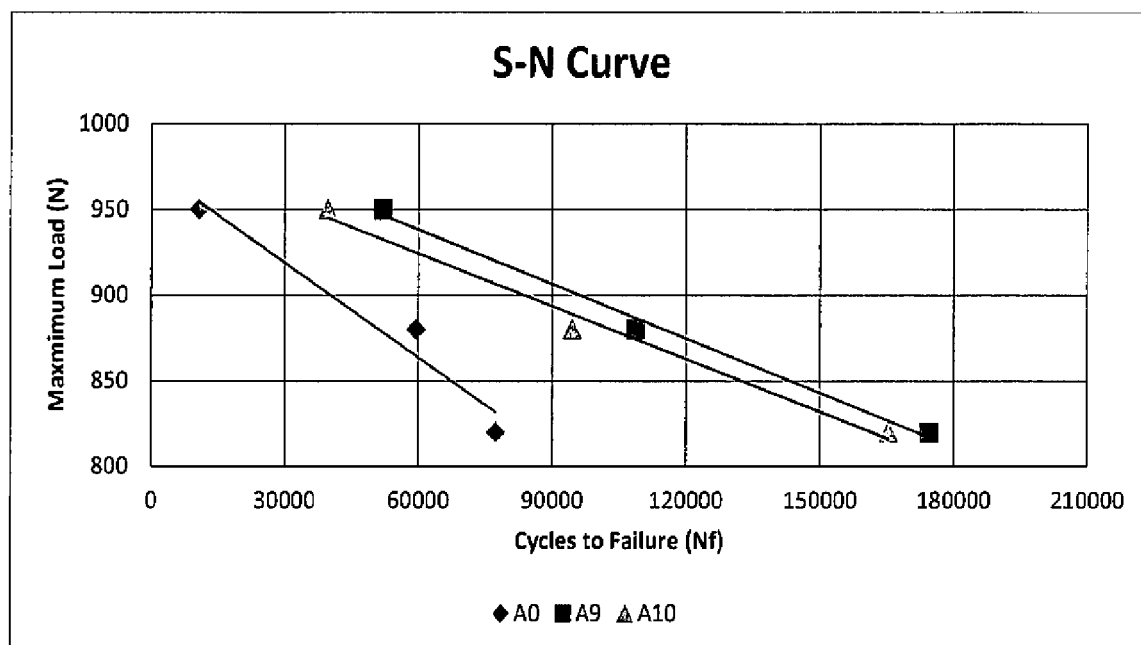
FIG. 10 shows a plot of fatigue life of selected alloys according to the present invention.

The fatigue life of alloys was measured at both high cycle (sample is subjected to alternating stress/strain within the elastic limit) and low cycle fatigue regime (sample is subjected to alternating stress/strain in plastic range), using a stress ratio of 0.1. Experimental results of selected alloys that show the superior fatigue life of the alloys described in the current invention are shown in FIG. 10. Example A0 is an alloy that does not have any intentional bismuth addition, Example A9 and A10 are with optimized bismuth and two minor alloying additions. Results indicate higher fatigue life in alloys containing bismuth compared to that of the alloy without bismuth.

It is interesting to note that creep test and fatigue test are following same trend, i.e., both tests show better properties of alloy with an optimized bismuth and with at least two minor alloying additions.

An addition of Al to Sn—Ag—Cu—Sb—Bi, has significant impact with respect to melting temperature and creep rupture time. For example, A13 and A14 are alloys with aluminum, have shown lower liquidus temperature (Table 1) and 50% higher creep rupture time compare to A9.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

What is claimed is:

1. A lead-free solder alloy comprising:
   from 8 to 15 wt. % antimony,
   from 0.05 to 2 wt. % bismuth,
   from 2.5 to 5 wt. % silver,
   from 0.5 to 1.5 wt. % copper, and
   from 0.01 to 0.5 wt. % nickel,
   one or more of:
      from 0.001-1 wt. % cobalt,
      from 0.001-1 wt. % titanium,
      from 0.001-1 wt. % manganese,
      from 0.001-1 wt. % germanium,
      from 0.001-10 wt % aluminum,
      from 0.001-10 wt. % silicon,
   optionally one or more of
      up to 5 wt. % indium,
      up to 1 wt. % chromium,
      up to 1 wt. % zinc,
      up to 1 wt. % arsenic,
      up to 1 wt. % iron,
      up to 1 wt. % phosphorus,
      up to 1 wt. % gold,
      up to 1 wt. % gallium,
      up to 1 wt. % tellurium,
      up to 1 wt. % selenium,
      up to 1 wt. % calcium,
      up to 1 wt. % vanadium,
      up to 1 wt. % molybdenum,
      up to 1 wt. % platinum,
      up to 1 wt. % rare earth elements,
   the balance tin and any unavoidable impurities.

2. The solder alloy according to claim 1, wherein the alloy comprises from 9 to 11 wt. % antimony.

3. The solder alloy according to claim 1, wherein the alloy comprises from 0.1 to 2.0 wt. % bismuth.

4. The solder alloy according to claim 1, wherein the alloy comprises from 2.5 to 4.2 wt. % silver.

5. The solder alloy according to claim 1, wherein the alloy comprises from 0.008 to 0.5 wt. % cobalt.

6. The solder alloy according to claim 1, wherein the alloy comprises from 0.003 to 0.5 wt. % titanium.

7. The solder alloy according to claim 1, wherein the alloy comprises from 0.003 to 0.5 wt. % manganese.

8. The solder alloy according to claim 1, wherein the alloy comprises from 0.005 to 0.1 wt. % germanium.

9. The solder alloy according to claim 1, wherein the alloy comprises from 0.005 to 5 wt. % aluminum.

10. The solder alloy according to claim 1, wherein the alloy comprises from 0.005 to 5 wt. % silicon.

11. The solder alloy according to claim 1, wherein the alloy comprises from 9 to 11 wt. % antimony, from 0.5 to 1.5 wt. % bismuth, from 2.5 to 3.5 wt. % silver, from 0.5 to 1.5 wt. % copper, from 0.01 to 0.05 wt. % nickel and the balance tin and any unavoidable impurities.

12. The solder alloy according to claim 1, wherein the alloy comprises from 9 to 11 wt. % antimony, from 0.5 to 1.5 wt. % bismuth, from 3.5 to 4.5 wt. % silver, from 0.5 to 1.5 wt. % copper, from 0.01 to 0.05 wt. % nickel and the balance tin and any unavoidable impurities.

13. The solder alloy according to claim 1, wherein the alloy comprises from 9 to 11 wt. % antimony, from 0.2 to 0.8 wt. % bismuth, from 2.5 to 3.5 wt. % silver, from 0.5 to 1.5 wt. % copper, from 0.01 to 0.05 wt. % nickel and the balance tin and any unavoidable impurities.

14. The solder alloy according to claim 1, wherein the alloy comprises from 9 to 11 wt. % antimony, from 0.2 to 0.8 wt. % bismuth, from 2.5 to 3.5 wt. % silver, from 0.5 to 1.5 wt. % copper, from 0.01 to 0.05 wt. % nickel, from 0.005 to 0.07 wt % germanium and the balance tin and any unavoidable impurities.

15. The solder alloy according to claim 1, wherein the alloy comprises from 9 to 11 wt. % antimony, from 0.1 to 0.4 wt. % bismuth, from 2.5 to 3.5 wt. % silver, from 0.5 to 1.5 wt. % copper, from 0.01 to 0.05 wt. % nickel and the balance tin and any unavoidable impurities.

16. The solder alloy according to claim 15, wherein the alloy further comprises from 0.005 to 0.015 wt. % germanium, from 0.005 to 0.015 wt. % manganese, from 0.005 to 0.015 wt. % titanium, from 0.01 to 0.08 wt. % cobalt, or combinations thereof.

17. The solder alloy according to claim 1, wherein the alloy comprises from 9 to 11 wt. % antimony, from 0.05 to 0.2 wt. % bismuth, from 3.5 to 4.5 wt. % silver, from 0.5 to 1.5 wt. % copper, from 0.01 to 0.05 wt. % nickel, from 0.005 to 0.05 wt. % cobalt and the balance tin and any unavoidable impurities.

18. The solder alloy according to claim 1, wherein the alloy comprises from 9 to 11 wt. % antimony, from 0.05 to 0.2 wt. % bismuth, from 2.5 to 3.5 wt. % silver, from 0.5 to 1.5 wt. % copper, from 0.01 to 0.05 wt. % nickel, from 0.005 to 0.05 wt. % titanium and the balance tin and any unavoidable impurities.

19. The solder alloy according to claim 1, wherein the alloy has a solidus temperature of 215° C. or higher.

20. The solder alloy according to claim 1, wherein the alloy is in the form of a bar, a stick, a solid or flux cored wire, a foil or strip, a film, a preform, a powder, a paste, or solder spheres.

21. The solder alloy according to claim 20, wherein the alloy is in the form of a paste.

22. The solder alloy according to claim 20, wherein the alloy is in the form of a preform.

23. A method of forming a solder joint comprising:
(i) providing two or more work pieces to be joined;
(ii) providing a solder alloy wherein the solder alloy comprises:
from 8 to 15 wt. % antimony,
from 0.05 to 2 wt. % bismuth,
from 2.5 to 5 wt. % silver,
from 0.5 to 1.5 wt. % copper, and
from 0.01 to 0.5 wt. % nickel,
one or more of:
up to from 0.001-1 wt. % cobalt,
up to from 0.001-1 wt. % titanium,
up to from 0.001-1 wt. % manganese,
up to from 0.001-1 wt. % germanium,
up to from 0.001-10 wt. % aluminum,
up to from 0.001-10 wt. % silicon,
optionally one or more of
up to 5 wt. % indium,
up to 1 wt. % chromium,
up to 1 wt. % zinc,
up to 1 wt. % arsenic,
up to 1 wt. % iron,
up to 1 wt. % phosphorus,
up to 1 wt. % gold,
up to 1 wt. % gallium,
up to 1 wt. % tellurium,
up to 1 wt. % selenium,
up to 1 wt. % calcium,
up to 1 wt. % vanadium,
up to 1 wt. % molybdenum,
up to 1 wt. % platinum,
up to 1 wt. % rare earth elements,
the balance tin and any unavoidable impurities; and
(iii) heating the solder alloy in the vicinity of the work pieces to be joined.

* * * * *